United States Patent
Yoshimi et al.

(10) Patent No.: US 8,553,130 B2
(45) Date of Patent: Oct. 8, 2013

(54) DISPLAY CONTROL APPARATUS, IMAGE PICKUP APPARATUS, DISPLAY CONTROL METHOD, AND STORAGE MEDIUM

(75) Inventors: Takashi Yoshimi, Kawasaki (JP); Katsuhito Yoshio, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/446,002

(22) Filed: Apr. 13, 2012

(65) Prior Publication Data

US 2012/0200598 A1 Aug. 9, 2012

Related U.S. Application Data

(62) Division of application No. 12/706,414, filed on Feb. 16, 2010, now Pat. No. 8,184,193.

(30) Foreign Application Priority Data

Feb. 17, 2009 (JP) ................................. 2009-033904

(51) Int. Cl.
*H04N 5/222* (2006.01)
*G06F 3/01* (2006.01)

(52) U.S. Cl.
USPC .................. 348/333.05; 348/333.11; 715/702

(58) Field of Classification Search
USPC .................. 348/239, 333.01–333.02, 333.05, 348/333.11; 715/702, 784, 863
See application file for complete search history.

(56) References Cited

U.S. PATENT DOCUMENTS

| | | | |
|---|---|---|---|
| 7,152,210 B1 | 12/2006 | Van Den Hoven et al. | |
| 7,714,926 B2 | 5/2010 | Kobayashi et al. | |
| 8,184,193 B2 * | 5/2012 | Yoshimi et al. | 348/333.05 |
| 2005/0190280 A1 | 9/2005 | Haas et al. | |
| 2007/0195354 A1 | 8/2007 | Tanaka | |
| 2008/0012954 A1 | 1/2008 | Sasaki et al. | |
| 2008/0062141 A1 | 3/2008 | Chandhri | |
| 2008/0222558 A1 | 9/2008 | Cho et al. | |
| 2009/0064031 A1 | 3/2009 | Bull et al. | |
| 2010/0085380 A1 | 4/2010 | Tsuda | |
| 2010/0125786 A1 | 5/2010 | Ozawa et al. | |
| 2011/0154196 A1 | 6/2011 | Icho et al. | |

FOREIGN PATENT DOCUMENTS

| | | |
|---|---|---|
| JP | 2002-125190 A | 4/2002 |
| JP | 2003-512676 A | 4/2003 |
| JP | 2006-259424 A | 9/2006 |
| JP | 2007-221721 A | 8/2007 |
| JP | 2009-009255 A | 1/2009 |

* cited by examiner

*Primary Examiner* — Daniel M Pasiewicz
(74) *Attorney, Agent, or Firm* — Fitzpatrick, Cella, Harper & Scinto

(57) ABSTRACT

A display control apparatus that enables to reliably and quickly search for a desired image. When a wheel is operated by a user by an amount less than a predetermined operation amount, image feeding is made in a first display mode where a plurality of images are displayed on an image display unit. When the wheel is operated by the user by an amount equal to or greater than the predetermined operation amount, image feeding is made in a second display mode where a larger number of images than in the first display mode are displayed on the image display unit in a smaller size than in the first display mode.

19 Claims, 11 Drawing Sheets

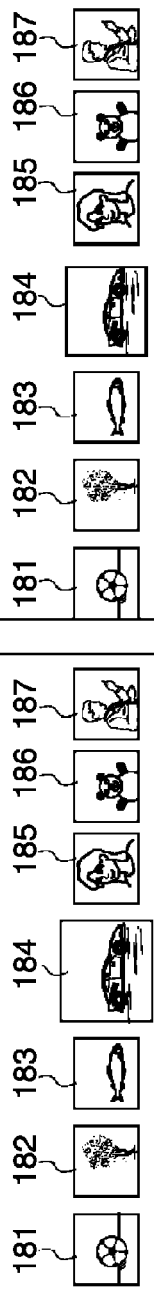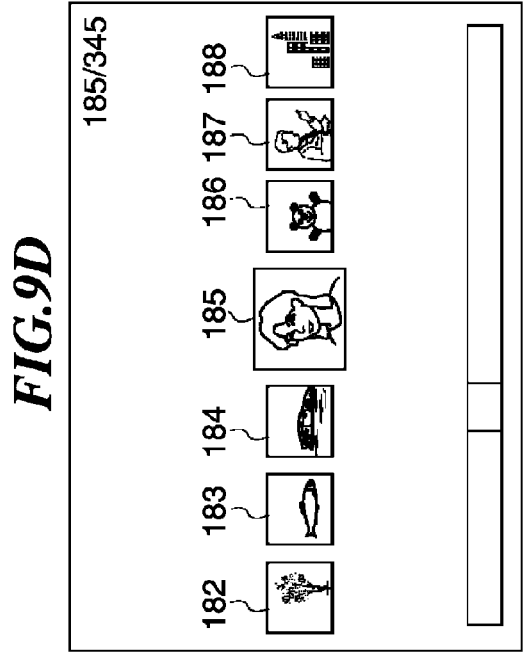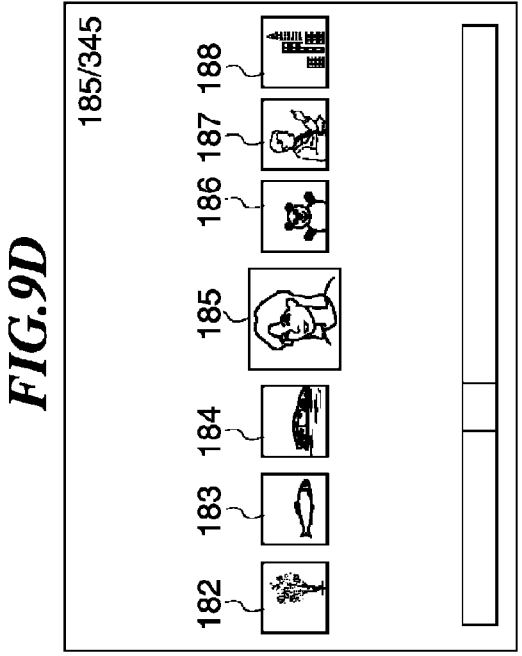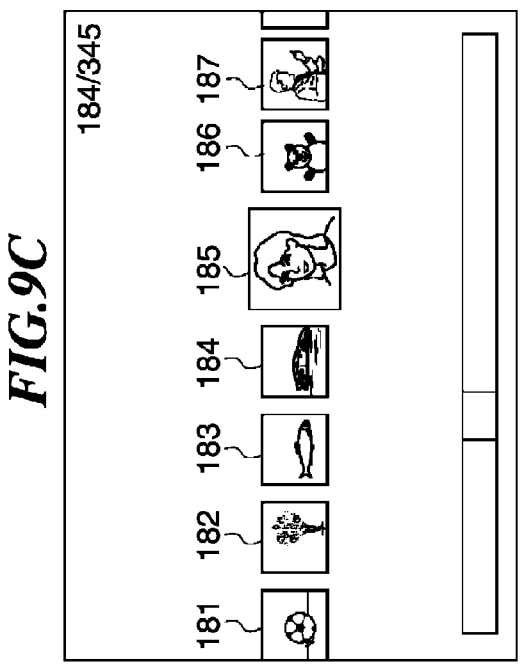

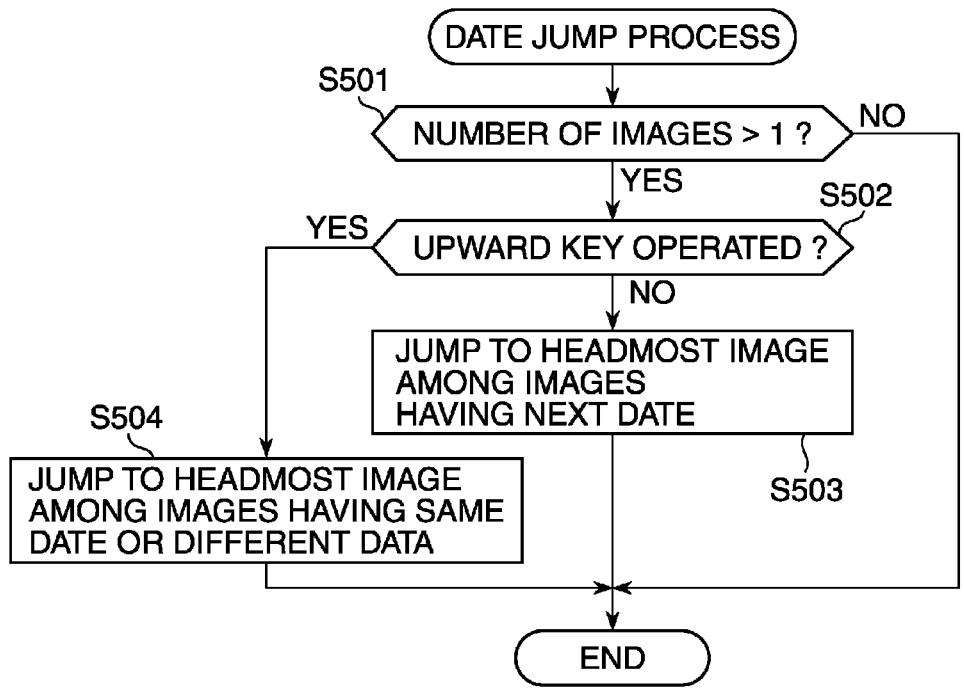
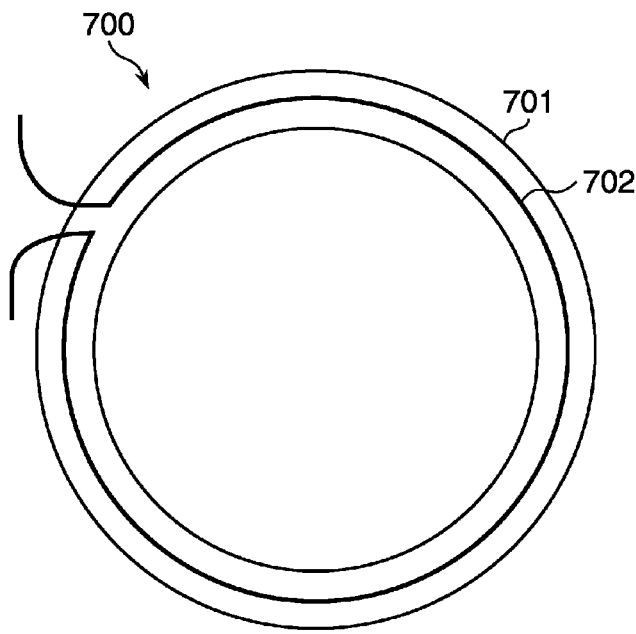

DISPLAY CONTROL APPARATUS, IMAGE PICKUP APPARATUS, DISPLAY CONTROL METHOD, AND STORAGE MEDIUM

This application is a division of application Ser. No. 12/706,414 filed Feb. 16, 2010.

BACKGROUND OF THE INVENTION

1. Field of the Invention

The present invention relates to a display control apparatus for performing display-image switching control, and relates to an image pickup apparatus, a display control method, and a storage medium.

2. Description of the Related Art

Conventionally, a technique has been known that displays images on a screen and feeds images in a predetermined direction on the screen according to manipulation of a rotary operating member (e.g., a wheel) at the time of image search. With this image feeding, images are fed one by one at a speed where images can be recognized by a user, and therefore, a desired image cannot quickly be searched for.

As another image search technique, an image processing apparatus has been proposed that has a user interface by which switching to multi-image feeding is made when an operation button is long pressed, whereas switching to single image feeding is made when the operation button is short pressed (see, e.g., Japanese Laid-open Patent Publication No. 2007-221721).

With the display-image switching method disclosed in Japanese Laid-open Patent Publication No. 2007-221721, it is easy to quickly search for a desired image, but a problem is posed that a desired image cannot reliably be searched for.

SUMMARY OF THE INVENTION

The present invention provides a display control apparatus that enables to reliably and quickly search for a desired image, and provides an image pickup apparatus, a display control method, and a storage medium.

According to a first aspect of this invention, there is provided a display control apparatus comprising a display control unit configured to perform control for making image feeding in one of a plurality of display modes that corresponds to a way in which an operation member for instructing image feeding is operated, the plurality of display modes including at least a first display mode where a plurality of images are simultaneously displayed on a display unit and a second display mode where a larger number of images than in the first display mode are displayed on the display unit in a smaller size than in the first display mode, a first control unit configured to perform control for making image feeding of images corresponding in number to an operation performed on a particular operation member, and a second control unit configured to perform control for switching the second display mode to the first display mode when a remaining number of images for which the image feeding is being performed under control of the first control unit in the second display mode after completion of operation on the particular operation member becomes equal to or less than a predetermined number and for continuing the image feeding of the remaining number of images in the first display mode.

According to second, third, and fourth aspects of this invention, there are provided an image pickup apparatus comprising the display control apparatus according to the first aspect, a display control method corresponding to the control display apparatus, and a computer-readable storage medium storing a program for executing the display control method.

With this invention, image feeding is carried out on the display unit in a display mode corresponding to operations performed on the operation member and the particular operation member, whereby a desired image can reliably and quickly be searched for.

Further features of the present invention will become apparent from the following description of exemplary embodiments with reference to the attached drawings.

BRIEF DESCRIPTION OF THE DRAWINGS

FIGS. 9A to 9D are views showing an example of image feeding in a second state of accelerated playback mode;

FIG. 12 is a flowchart showing the details of a date jump process in FIGS. 7 and 11; and FIG. 13 is a schematic view showing the internal construction of a pressure-sensitive touch sensor mounted on an image pickup apparatus according to another embodiment of this invention.

DETAILED DESCRIPTION OF THE PREFERRED EMBODIMENTS

The present invention will now be described in detail below with reference to the drawings showing preferred embodiments thereof.

Figure 1:
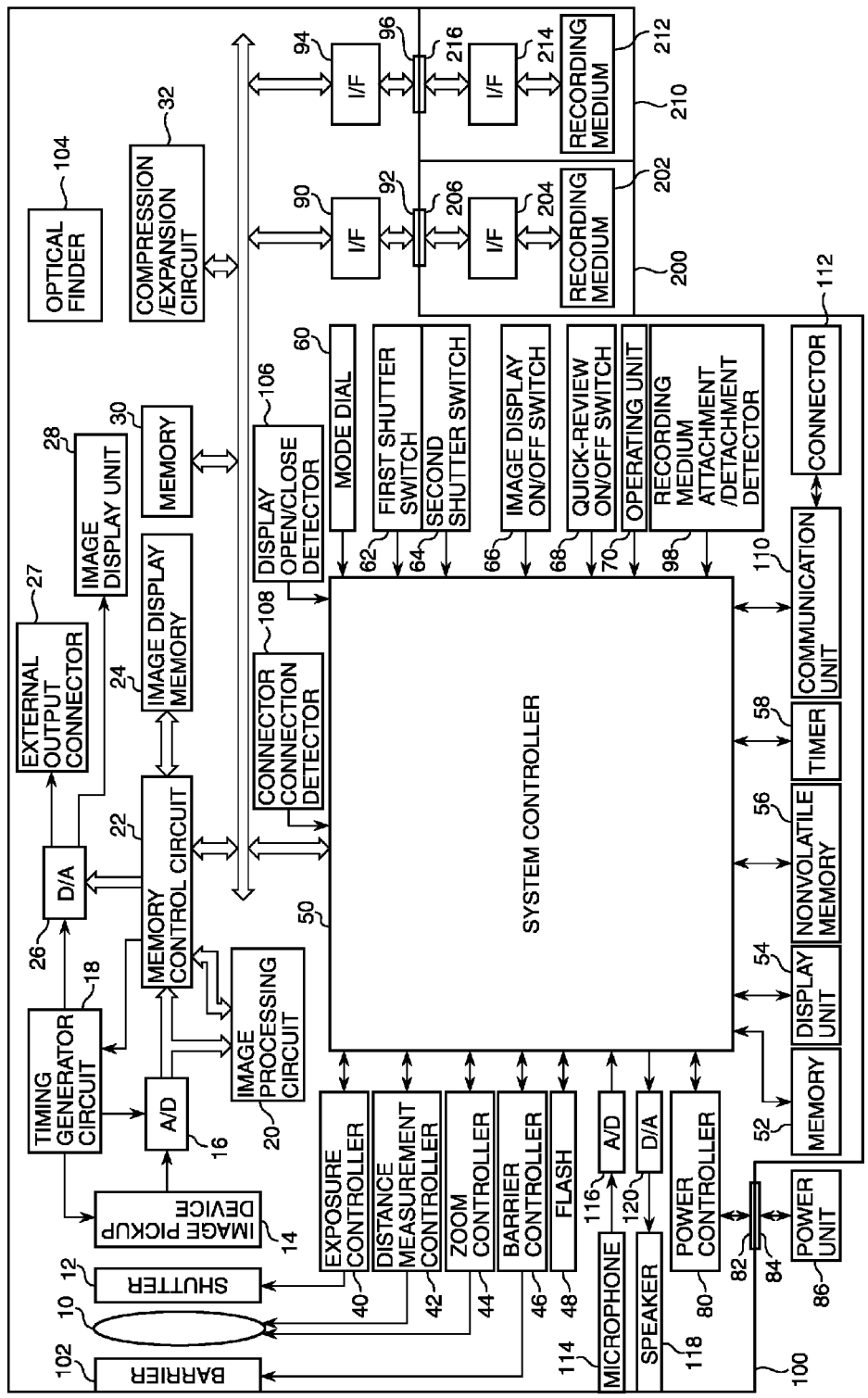
FIG. 1 is a block diagram showing the construction of an image pickup apparatus according to one embodiment of this invention.

FIG. 1 shows in block diagram the construction of an image pickup apparatus according to one embodiment of this invention.

Referring to FIG. 1, an image pickup apparatus 100 is configured as a digital camera and includes a taking lens 10, a shutter 12 having a diaphragm function, an image pickup device 14, an image display unit 28, a system controller 50 (display control apparatus), and an operating unit 70. It should be noted that a description of constructions of the image pickup apparatus 100 not directly relating to this invention will be simplified or omitted.

The image pickup device 14 converts, into an electrical signal, an optical image of an object formed on the device 14 through the taking lens 10 and the shutter 12. An A/D converter 16 analog-to-digital converts an analog signal output from the image pickup device 14. A timing generator circuit 18 is controlled by a memory control circuit 22 and the system controller 50 and supplies a clock signal and a control signal to the image pickup device 14, the A/D converter 16, and a D/A converter 26. A barrier 102 covers and prevents an image pickup unit (taking lens 10 and image pickup device 14) from being tainted and damaged.

The image processing circuit 20 performs predetermined processing of pixel interpolation and color conversion on data output from the A/D converter 16 or from the memory control circuit 22, performs a predetermined calculation based on image data picked up by the image pickup apparatus, and based on a calculation result, performs processing of AF (auto-focus), AE (automatic exposure), and EF (electronic flash) under the control of the system controller 50. The image processing circuit 20 also performs a predetermined calculation using the picked-up image data, and based on a calculation result, performs a TTL automatic white balance (AWB) process.

The memory control circuit 22 controls the A/D converter 16, the timing generator circuit 18, the image processing circuit 20, an image display memory 24, the D/A converter 26, a memory 30, and a compression/expansion circuit 32. Data from the A/D converter 16 is stored via the image processing circuit 20 and the memory control circuit 22 or via the memory control circuit 22 into the image display memory 24 or the memory 30.

An external output connector 27 is for outputting an output of the D/A converter 26 to an external monitor (not shown). When the external output connector 27 is connected to a connector of the external monitor, the system controller 50 is able to know, via a connector connection detector 108, a state of external output.

The image display unit 28 is implemented by, e.g., a liquid crystal display such as a TFT LCD (thin film transistor liquid crystal display), and displays display-image data written into the image display memory 24 and supplied to the display unit 28 via the D/A converter 26. An electronic finder function can be realized by displaying in sequence on the display unit 28 image data picked up by the image pickup apparatus. Display on the unit 28 can be ON/OFF under the control of the system controller 50, and power consumption of the image pickup apparatus can considerably be reduced by making display on the display unit 28 OFF.

For image feeding on the image display unit 28, there are two modes, i.e., a single playback mode where single image feeding is made for accurate image search according to an operation of a leftward or rightward key (described later) and an accelerated playback mode where multi-image feeding is made according to a wheel operation for quick search for a desired image.

In the single image feed, a single image is displayed on the entire screen of the image display unit 28, and the displayed image can be shifted by one image so as to be switched to another image. In the multi-image feed, thumbnail images are displayed on the display unit 28 in a line from left to right in a smaller size than in the single image feeding, and the displayed images can be shifted by plural images so as to be switched to other images. The details will be described later.

It should be noted that the image display unit 28 can be coupled through a rotary hinge to a main body of the image pickup apparatus. With this construction, the direction and angle of the image display unit 28 can arbitrarily be set in order to use an electronic finder function, a playback display function, and other display functions. The image display unit 28 can be housed, with its display screen facing the main body of the image pickup apparatus. A housed state of the image display unit 28 can be detected by a display open/close detector 106, and a displaying operation of the image display unit 28 can be stopped.

The memory 30 is for storing still images or moving images photographed by the image pickup apparatus. The memory 30 has a capacity large enough to store a predetermined number of still images or to store moving images of a predetermined time period, and therefore, a large amount of images can be written into the memory 30 at high speed even when continuous photographing for continuously photographing still images is made or panorama photographing is made. The memory 30 can also be used as a work area for the system controller 50 and as a write buffer for the recording media 200, 210. The memory 30 also stores information on the number of wheel events and a direction (rightward or leftward) of rotation of wheel events, as will be described later.

A compression/expansion circuit 32 is for compressing or expanding image data by, e.g., adaptive discrete cosine transformation (ADCT). To this end, the compression/expansion circuit 32 reads image data stored in the memory 30, performs compression or expansion processing on the read data, and stores resultant data into the memory 30.

An exposure controller 40 is controlled by the TTL method, controls the shutter 12, and cooperates with a flash 48 to achieve a flash adjustment function. A distance measurement controller 42 is controlled by the TTL method and controls focusing of the taking lens 10. The exposure controller 40 and the distance measurement controller 42 are controlled by the system controller 50 based on a result of image data calculation by the image processing circuit 20. A zoom controller 44 controls zooming of the taking lens 10. A barrier controller 46 controls an operation of the barrier 102. In addition to the flash adjustment function, the flash 48 has a function of projecting AF auxiliary light.

The system controller 50 controls the entire image pickup apparatus. The controller 50 executes a program stored in the nonvolatile memory 56 to execute processes described later referring to flowcharts. The controller 50 also performs control for switching the image feeding process to either the single playback mode or the accelerated playback mode.

When the leftward or rightward key is operated, the system controller 50 erases an image displayed on the image display unit 28 and displays another image corresponding to a function assigned to the leftward or rightward key (e.g., an image having an immediately subsequent file number or an immediately preceding file number).

A display unit 54 displays or informs an operation state of the image pickup apparatus, a message, and the like by means of characters, image, voice, etc. in response to a program being performed by the system controller 50. The display unit 54 is configured by a combination of, e.g., an LCD, LEDs, and a sounding device and disposed near the operating unit 70 so as to be easily viewable. Functions of the display unit 54 are partly incorporated into the optical finder 104. A detailed description of contents displayed on the display unit 54 is omitted.

A memory 52 is used such that constants and variables for operation of the system controller 50 and a program read from the nonvolatile memory 56 are developed thereon. The memory 56 is implemented by an electrically erasable and storable memory, e.g., an EEPROM, and stores constants for operation of the system controller 50, a program for execution of flowcharts described below, etc. A timer 58 is used to measure a data recording speed onto the recording media 200, 210 and a data acquisition rate.

A mode dial switch 60 is operated to turn ON/OFF the power source of the image pickup apparatus and to change the settings of function modes. The function modes include an automatic photographing mode, photographing modes (including a panorama photographing mode and a moving image photographing mode), a playback mode, a multiple-image playback/delete mode, and a PC-connection mode.

A first shutter switch 62 is made ON when an operation of a shutter button 61 is in progress (see FIG. 2), and gives an instruction to start processing of AF, AE, AWB, EF, etc. A second shutter switch 64 is made ON at completion of the operation of the shutter button 61 to give an instruction to start an exposure process in which a signal read from the image pickup device 14 is written as image data into the memory 30 via the A/D converter 16 and the memory control circuit 22. The second shutter switch 64 is operated to give an instruction to start a series of processes in which development is performed by the image processing circuit 20 or the memory control circuit 22, and image data is read from the memory 30, compressed at the compression/expansion circuit 32, and written into the recording medium 200 or 210. Also, the second shutter switch 64 is operated to give an instruction to start and stop moving image photographing.

An image display ON/OFF switch 66 is operated to set ON/OFF of the image display unit 28. Power saving can be achieved by setting the image display unit 28 OFF to terminate the current supply to the unit 28 at execution of photographing using the optical finder 104. A quick-review ON/OFF switch 68 is operated to set a quick-review function for automatically playing back photographed image data immediately after the photographing. In this embodiment, it is assumed that the image pickup apparatus comprises a function for setting the quick-review function for a case where the image display unit 28 is made OFF.

The operating unit 70 includes a menu button, a set button, a macro button, a multi-screen-playback new-page button, a flash setting button, a single/continuous/self-timer switching button, a menu movement plus (+) button, and a menu movement minus (−) button. The operating unit 70 further includes a playback image movement plus (+) button, a playback image movement minus (−) button, a photographing quality selection button, a display button for ON/OFF setting of the image display unit 28, a zoom operation unit for switching a single-screen display/multi-screen display, a touch panel, etc. Illustrations of other buttons are omitted.

A power controller 80 detects via connectors 82, 84 battery attachment/detachment to a power unit 86, battery type, and battery residual capacity. Based on detection results and an instruction from the system controller 50, the power controller 80 supplies various parts (including the recording media 200, 210) with required voltage for required time periods. The power unit 86 is implemented by, e.g., a primary battery such as an alkaline battery or a lithium battery, or a secondary battery such as a NiCd battery, NiMH battery, or Li battery, or an AC adapter.

Interface units 90, 94 provide interfaces with the recording media 200, 210 via connectors 92, 96. A recording medium attachment/detachment detector 98 detects whether the recording media 200, 210 are attached to the connectors 92, 96. A description on the numbers and types of the interface units and the connectors is omitted.

The optical finder 104 enables the user to perform photographing without using the electronic finder function of the image display unit 28, but only using the optical finder 104. The display open/close detector 106 detects whether the display unit 28 is in a state where it is housed with its display screen facing the main body of the image pickup apparatus. When it is detected that the display unit 28 is in a housed state, a display operation of the unit 28 can be stopped to prevent unnecessary power consumption.

A communication unit 110 has communication functions such as RS232C, USB, IEEE 1394, P1284, SCSI, modem, LAN, wireless communication, etc. A connector 112 connects the image pickup apparatus with other device via the communication unit 110. For wireless communication, an antenna is disposed in place of the connector 112.

A microphone 114 picks up voice data around the image pickup apparatus at execution of photographing by the image pickup apparatus. An A/D converter 116 analog-to-digital converts voice data picked up by the microphone 114 and outputs the converted data to the system controller 50. A speaker 118 reproduces voice data. A D/A converter 120 digital-to-analog converts digital voice data output from the controller 50 for voice data reproduction by the speaker 118.

The recording media 200, 210 are each implemented by, e.g., a memory card or a hard disk. The recording medium 200 includes a recording unit implemented by a semiconductor memory or a magnetic disk, an I/F unit 204 as an interface with the image pickup apparatus, and a connector 206 for connection with the image pickup apparatus. Similarly, the recording medium 210 includes a recording unit 212, an I/F unit 214, and a connector 216. It should be noted that in a case where the recording media 200, 210 are each implemented by a PCMCA standard compatible PC card or a compact flash (registered trademark) card, an information storage circuit that stores performance information is incorporated in the recording medium in some cases.

Figure 2:
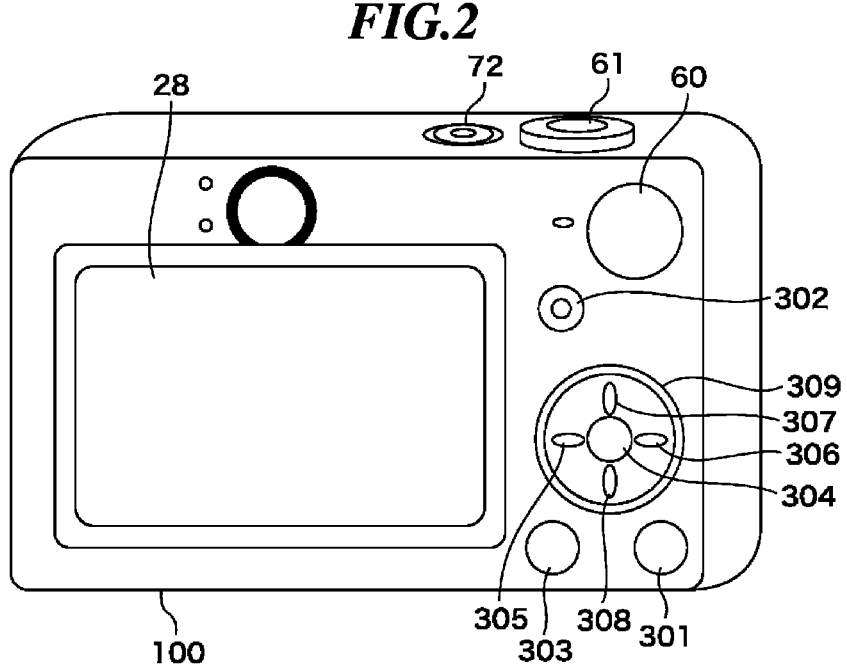
FIG. 2 is a schematic perspective view showing an external appearance of the image pickup apparatus.

FIG. 2 schematically shows an external appearance of the image pickup apparatus.

As shown in FIG. 2, the image pickup apparatus 100 has a housing on which there are provided the image display unit 28, the mode dial switch 60, the shutter button 61, a power switch 72, a zoom operation unit (not shown), a menu button 301, an enter button 302, a display button 303, a SET button 304, direction buttons 305 to 308, and a rotary encoder 309. It should be noted that the operating unit 70 in FIG. 1 includes a zoom operation unit as well as the menu button 301 to the rotary encoder 309.

The image display unit 28 displays a through-image of an object at photographing and displays an image recorded in the recording medium or the like at image reproduction. The display unit 28 provides a GUI (graphical user interface) for display of photographing information, setting items, etc. according to a state of the image pickup apparatus.

The menu button 301 is operated to set photographing conditions and to display a menu showing a state of the image pickup apparatus. The menu includes one or more selectable items where a value can be changed. The enter button 302 is operated to decide a desired value and to select a desired item on the menu. When the enter button 302 is depressed, the system controller 50 decides or selects a currently selected value or a currently selected item.

The display button 303 is operated to select display/non-display of photographing information on photographed images and to select whether the image display unit 28 should be made to function as an EVF (electronic view finder). The SET button 304 is operated to make a shift from a menu screen currently displayed on the image display unit 28 to another menu screen for setting further detailed conditions or the like.

The direction buttons consist of leftward and rightward buttons 305, 306 (button operation members) and upward and downward buttons 307, 308. The direction buttons 305 to 308 are operated to shift a cursor, a designation frame, or a highlighted part that designates one of selection candidates displayed on the image display unit 28. These buttons are also operated to change the direction or to change the position of an index (e.g., a pointer on the screen) that identifies a designated selection candidate.

The direction buttons 305 to 308 are also operated to increase or decrease, e.g., a correction value or a value representing date and time. In this embodiment, when a selection candidate is changed by using the direction buttons 305 to 308, if one of the buttons is depressed in a state designating a selection candidate located at one end of the display unit 28, a shift is made to another selection candidate located at another end of the unit 28.

The rotary encoder 309 is a rotatable operation member and used to move a designation frame. In this embodiment, when the designation frame is moved by the rotary encoder 309, the designation frame stops moving at an item located at one end of a row of items and does not move further, if the rotary encoder 309 is kept rotating and input is continuously entered. When the rotation of the rotary encoder 309 is temporarily stopped and after a short time interval the rotary encoder 309 is rotatively operated again in the same direction, the designation frame is moved to an item located at another end of the row.

It should be noted that in the following description and in the drawings (FIGS. 4, 7, 11 and 12), the direction buttons (leftward, rightward, upward, and downward buttons) will also be referred to as direction keys (leftward, rightward, upward, and downward keys).

Figure 3:
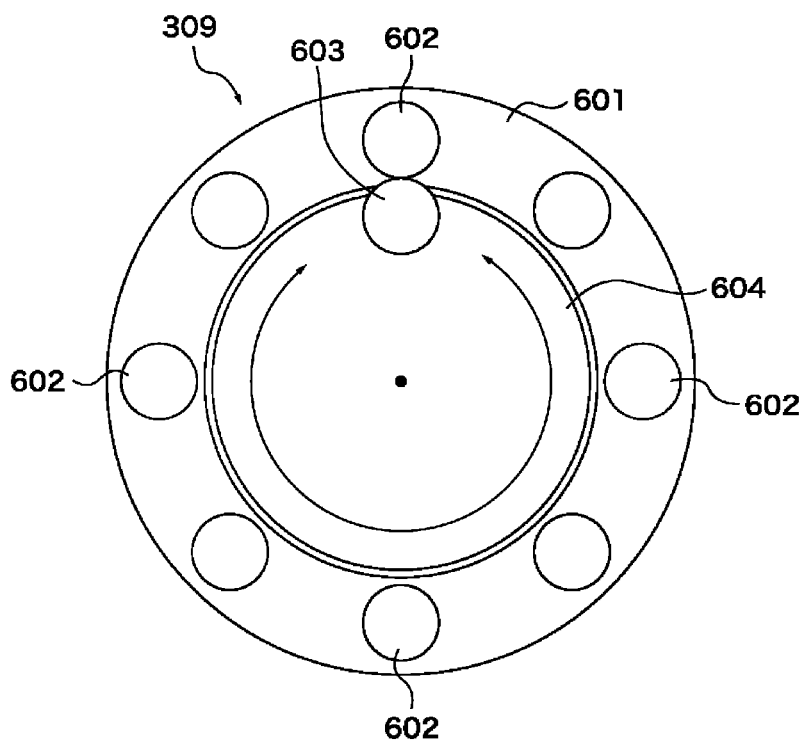
FIG. 3 is a schematic view showing the internal construction of an rotary encoder of the image pickup apparatus.

FIG. 3 schematically shows the internal construction of the rotary encoder 309 of the image pickup apparatus.

As shown in FIG. 3, the rotary encoder 309 includes a base 601, contacts 602, 603, and a rotary part 604. The base 601 is formed into, e.g., an annular shape (or circular shape). The contacts 602 each made of an electrically conductive member or a magnet are disposed circumferentially at equal intervals and fixed at plural places (eight places in this embodiment) on the base 601. The rotary part 604 is formed into a circular shape (or annular shape) and disposed inside and concentrically with the base 601. The contact 603 made of an electrically conductive member or a magnet is fixed at one place on an outer periphery of the rotary part 604.

The rotary part 604 is rotated in a circumferential direction by a user's manipulation, as shown by arrow. When the contact 603 is brought in contact with any of the contacts 602, an electrical signal is generated and based on the signal, the system controller 50 determines which of the eight contacts 602 is in contact with the contact 603. The controller 50 confirms, by software, a contact position between the contacts at intervals of an extremely short time period (in the order of msec), and compares a current contact position with a preceding contact position to detect the number of contacts through which the rotary part 604 moves.

Since the contact position between contacts of the rotary encoder 309 is confirmed at intervals of an extremely short time period, the time interval can be negligible for the user, and therefore, it can be regarded for the user that an amount of movement of the rotary part 604 corresponding to an amount of operation on the rotary encoder 309 is detected realtime. In this embodiment, when an amount of movement larger than a given angle is detected, it is recognized that the rotary encoder 309 is operated.

In this embodiment, image feeding is performed in the single playback mode when a moving speed (operation amount) of the contact 603 of the rotary part 604 of the rotary encoder 309 relative to the contacts 602 of the base 601 is less than a predetermined value. On the other hand, image feeding is carried out in the accelerated playback mode when the moving speed is equal to or larger than the predetermined value.

It should be noted that it is possible to perform image feeding in the single playback mode when an amount of continuous movement (operation amount) of the contact 603 relative to the contacts 602 is less than a predetermined value and to perform image feeding in the accelerated playback mode when the amount of continuous movement is equal to or larger than the predetermined value.

The rotary encoder 309 is configured that the contacts of the rotary part and the base are in contact at their outer peripheries with each other, but this is not limitative. For example, an annular or circular rotary part can be disposed on an upper surface of an annular or circular base such that contacts of the rotary part and the base are made in contact with each other in axial direction (i.e., in front-rear direction of the drawing paper of FIG. 3). Also, it is not inevitably necessary to confirm a contact state between the contacts, and there may be used any operation member as long as it enables to confirm a user's rotating operation thereon.

In this embodiment, operation on the rotary encoder 309 will be referred to as the wheel operation. An input command in terms of electrical signal generated each time the rotary part 604 of the rotary encoder 309 is circumferentially moved over a distance between adjacent contacts 602 will be referred to as one wheel event. It is a matter of design choice to determine the number of contacts over which the rotary part must be moved to give one wheel event. What amount of rotating operation of the rotary encoder 309 gives what degree of operation feeling can also be designed by a designer.

The power switch 72 is operated to start or stop the image pickup apparatus (or to turn ON/OFF the main power source of the image pickup apparatus). By operating the mode dial switch 60, it is possible to make a shift between a photographing mode for photographing images and an image viewing mode for playing back images.

Next, with reference to FIGS. 4 to 12, a description will be given of operation of the image pickup apparatus of this embodiment.

In this embodiment, multi-image feeding is performed on the image display unit 28 according to an operation of the rotary encoder 309 (wheel operation) to quickly search for a desired image from the recording medium, and single image feeding is performed on the display unit 28 according to an operation of the leftward button 305 or the rightward button 306 to accurately select a desired image.

(Playback Mode Process)

Figure 4:
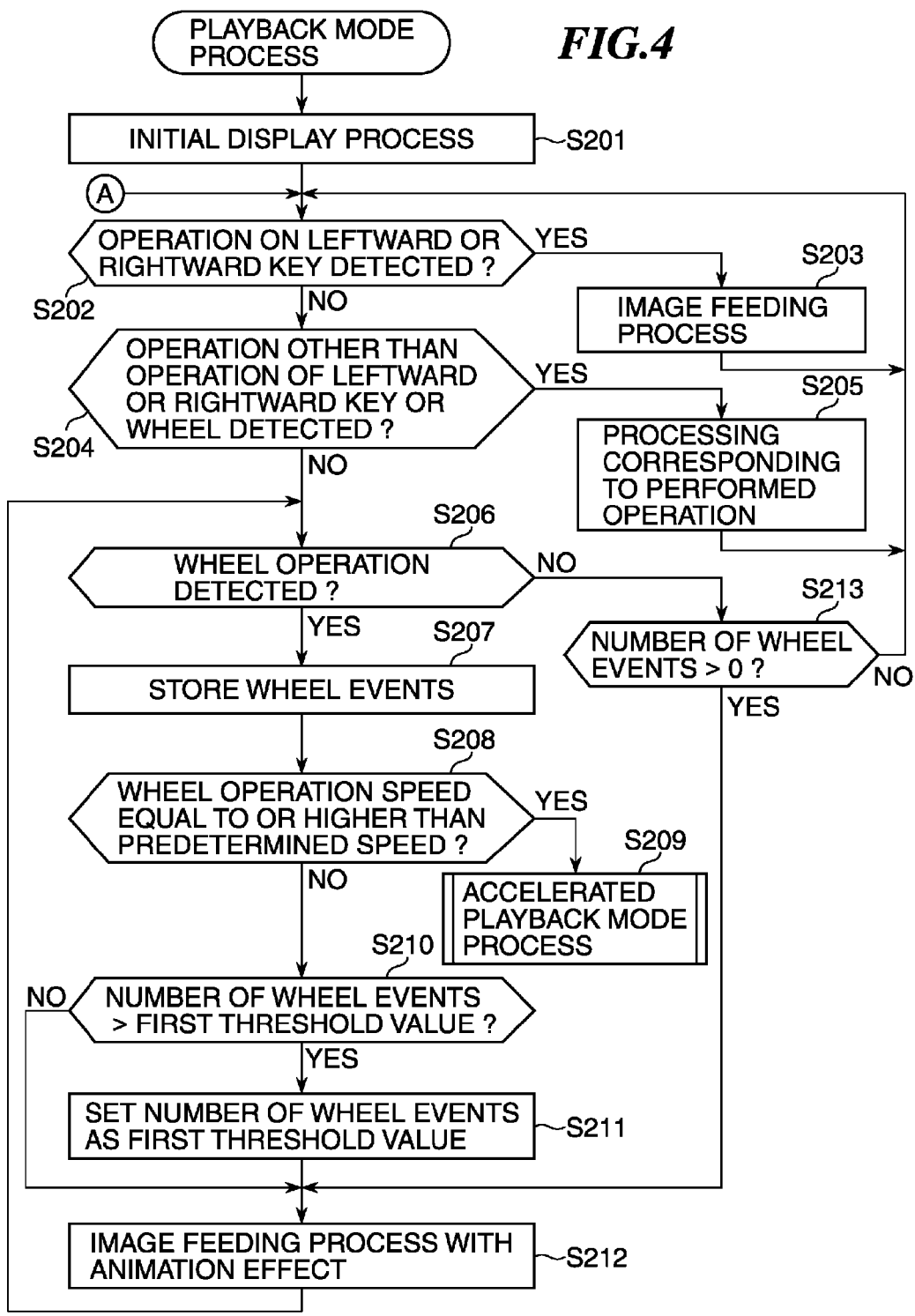
FIG. 4 is a flowchart showing a playback mode process performed by the image pickup apparatus.

FIG. 4 shows in flowchart a playback mode process performed by the image pickup apparatus.

The playback mode process is realized by the system controller 50 by developing, on the memory 52, a program stored in the nonvolatile memory 56 and by executing the program. When the power of the image pickup apparatus is turned on by a user and the playback mode is set via the mode dial switch 60, the controller 50 starts the playback mode process. It should be noted that information on the number of wheel events and a direction (rightward or leftward) of rotation of wheel events are stored in the memory 30.

Referring to FIG. 4, at start of the playback mode process, the system controller 50 carries out an initial display process where one image file is read from, e.g., the recording medium 200 and displayed on the image display unit 28 (step S201). The image file to be read from the recording medium 200 is an image that satisfies a predetermined condition for initial image to be first displayed on the display unit 28 in the playback mode process.

Figure 5:
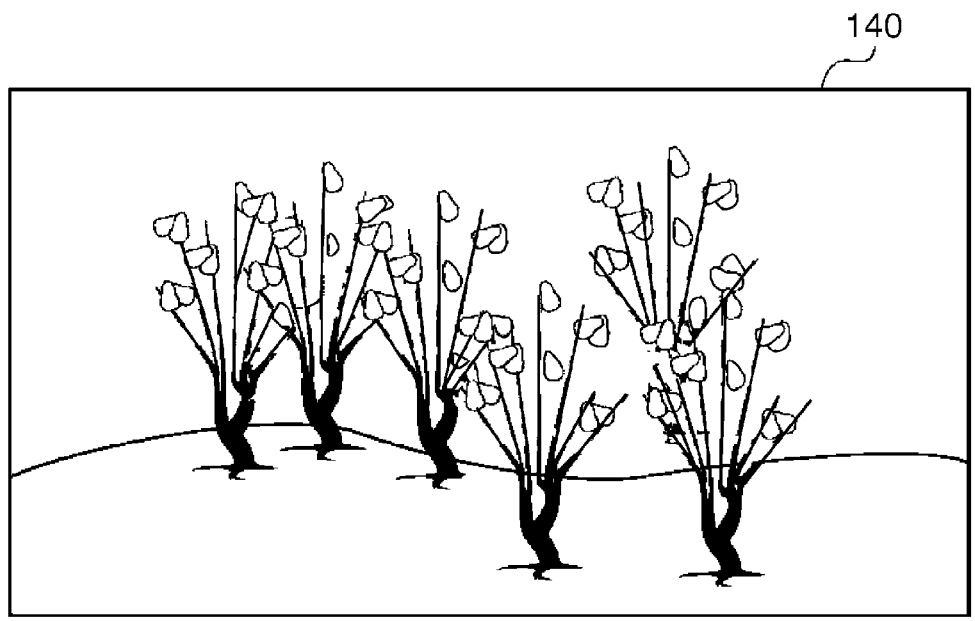
FIG. 5 is a view showing an example of initial display on an image display unit of the image pickup apparatus.
Figure 6:
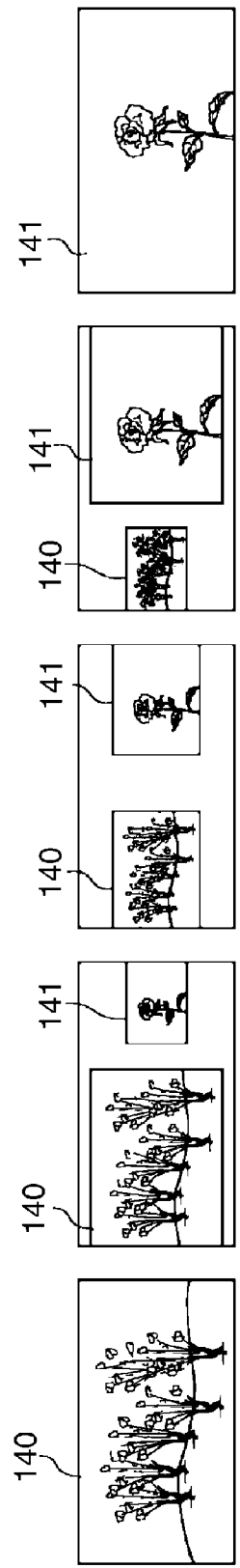
FIGS. 6A to 6E are views showing an example of image feeding with animation effect performed in a single playback mode in response to a wheel operation.

Specifically, the image that satisfies the predetermined condition for initial image is the oldest or newest image among images recorded in, e.g., the recording medium 200 or an image which is represented by resume information and which was played back immediately before completion of the preceding playback mode process. The controller 50 performs zoom processing on a base image data (original image data), which is contained in an image file of an image that satisfies the predetermined condition for initial image, such that the resultant image just fits to the entire display region on the image display unit 28. The zoom-processed image is displayed on the entire screen (entire display region) of the image display unit 28. In FIG. 5, there is shown an example of initial display (image 140) (single image display).

Next, the system controller 50 determines whether the leftward or rightward key (leftward button 305 or rightward button 306) is operated (depressed) by the user (step S202). When detecting that the leftward or rightward key is operated, the controller 50 performs an image feeding process in the single playback mode (step S203).

Specifically, in a case that depression of the rightward button 306 is detected, an image whose file number is immediately subsequent to that of the image currently displayed on the image display unit 28 is read from the recording medium 200 and then displayed on the display unit 28. On the other hand, if the leftward button 305 being depressed is detected, an image whose file number immediately precedes that of the currently displayed image is read from the recording medium 200 and displayed on the display unit 28.

When not detecting the leftward or rightward key being operated, the system controller 50 determines whether some other operation than an operation of the leftward or rightward key or of the wheel is performed (step S204). When determining that other operation is made, the controller 50 executes processing corresponding to the performed operation (step S205). The processing corresponding to the performed operation is image processing such as an image zoom processing or red-eye correction or other processing such as transition to multi-playback mode, image deletion, mode transition, or power source OFF.

When determining that no operation other than an operation of the leftward or rightward key or of the wheel is performed, the system controller 50 determines whether a wheel operation is made (step S206). When determining that a wheel operation is made, the controller 50 determines whether a direction of rotation of the wheel operation (operation of the rotary encoder 309) is rightward or leftward (clockwise or anticlockwise). As a wheel event corresponding to an operation amount, the controller 50 stores into the memory 30 a rightward rotational wheel event when determining that a rightward wheel rotation is made, and stores a leftward rotational wheel event when determining that a leftward wheel rotation is made (step S207).

Next, the system controller 50 determines whether a user's wheel operation speed (operation amount, moving speed, or continuous moving amount) is equal to or higher than a predetermined speed (step S208). In this embodiment, it is determined whether a value obtained by dividing a predetermined time period by the number of wheel events is smaller than a predetermined value. In a case for example that the predetermined time period is one second and the predetermined value is 250, it is determined whether a value obtained by dividing 1000 msec divided by the number of wheel events is smaller than 250. Thus, if the number of occurrences of wheel events per one second is 4 or less, the answer to step S208 becomes NO (it is determined that operation amount per predetermined time period is less than the predetermined amount). On the other hand, the answer becomes YES, if the number of occurrences of wheel events per one second is equal to or larger than 5.

When determining that the wheel operation speed is equal to or higher than the predetermined speed, the controller 50 changes the image playback mode from the single playback mode to the accelerated playback mode, and executes an accelerated playback mode process (step S209). The details of the accelerated playback mode process will be described later with reference to FIG. 7.

When determining that the wheel operation speed is lower than the predetermined speed, the controller 50 determines whether the number of wheel events stored in the memory 30 exceeds a first predetermined threshold value (step S210). If it is determined that the number of wheel events does not exceed the first threshold value, the flow proceeds to step S212.

When determining that the number of wheel events exceeds the first threshold value, the controller 50 stores (sets) the number of wheel events stored in the memory 30 as the first threshold value (step S211), and proceeds to step S212. At completion of processing in step S211, the upper limit number of wheel events stored in the memory 30 becomes equal to the first threshold value.

Next, the controller 50 performs the image feeding process in a single playback mode in response to the wheel operation (step S212). In this process, image feeding is carried out with animation effect showing a direction of image feeding on the screen of the display unit 28.

Whether image on the screen should be switched to a subsequent image or returned to a preceding image is determined based on information on the direction of rotation of wheel events stored in the memory 30. The controller 50 causes the image to be switched to the immediately subsequent image, if the direction of rotation of wheel events is rightward, and causes the image to be returned to the immediately preceding image, if the direction is leftward. One wheel event is consumed at each single image feeding.

FIGS. 6A to 6E shows an example of image feeding with animation effect performed in the single playback mode in response to a wheel operation. In this example, there is shown how image feeding is made from an image 140 (FIG. 6A) displayed on the image display unit 28 to the immediately subsequent image 141 (FIG. 6E) in response to a rightward rotational wheel operation for one wheel event.

Specifically, the image 140 displayed full screen on the image display unit 28 is moved leftward (erased) on the screen, while being gradually stepwise reduced in size. On the other hand, the image 141 is moved from the right side toward the center on the screen, while being gradually enlarged stepwise. Finally, instead of the image 140, the image 141 is full-screen displayed on the image display unit 28.

With this animation effect (image switching effect), it is possible to indicate to the user to which direction a wheel operation is made, i.e., to which direction image feeding is made. The user is therefore able to know whether a displayed image is being switched to a subsequent image or returned to a preceding image by the image feeding according to the direction of rotation of current wheel operation.

Referring to FIG. 4 again, if it is determined that a wheel operation is not performed by the user (No to step S206), the system controller 50 determines whether the number of wheel events stored in the memory 30 is larger than zero (step S213).

When it is determined that the number of wheel events is equal to or less than zero, the flow returns to step S202. On the other hand, when determining that the number of wheel events is larger than zero, the controller 50 performs the image feeding process with animation effect in the single playback mode (step S212).

As described above, even after the user stops performing a wheel operation, the processing in steps S206, S213, and S212 is repeated to thereby continue the image feeding until all the number of wheel events stored in the memory 30 are consumed. As a result, an effect to make the image feeding appear to continue by inertia is provided even after the user stops performing the wheel operation.

As a result of the processing in step S211, the number of wheel events stored in the memory 30 is set to have an upper limit equal to the first threshold value. It is assumed that the first threshold value is set to, e.g., 3, and the user continues a wheel operation for a while in such a manner that wheel events are stored into the memory 30 at a speed higher than a speed of consumption of wheel events in the image feeding process in step S212, but not exceeding the predetermined speed. Under this assumption, when the user stops performing the wheel operation, the image feeding with animation effect described referring to FIGS. 6A to 6E is performed one image by one image up to an image which is three images ahead of an image displayed on the display unit 28 when the wheel operation is stopped.

(Accelerated Playback Mode Process)

Figure 7:
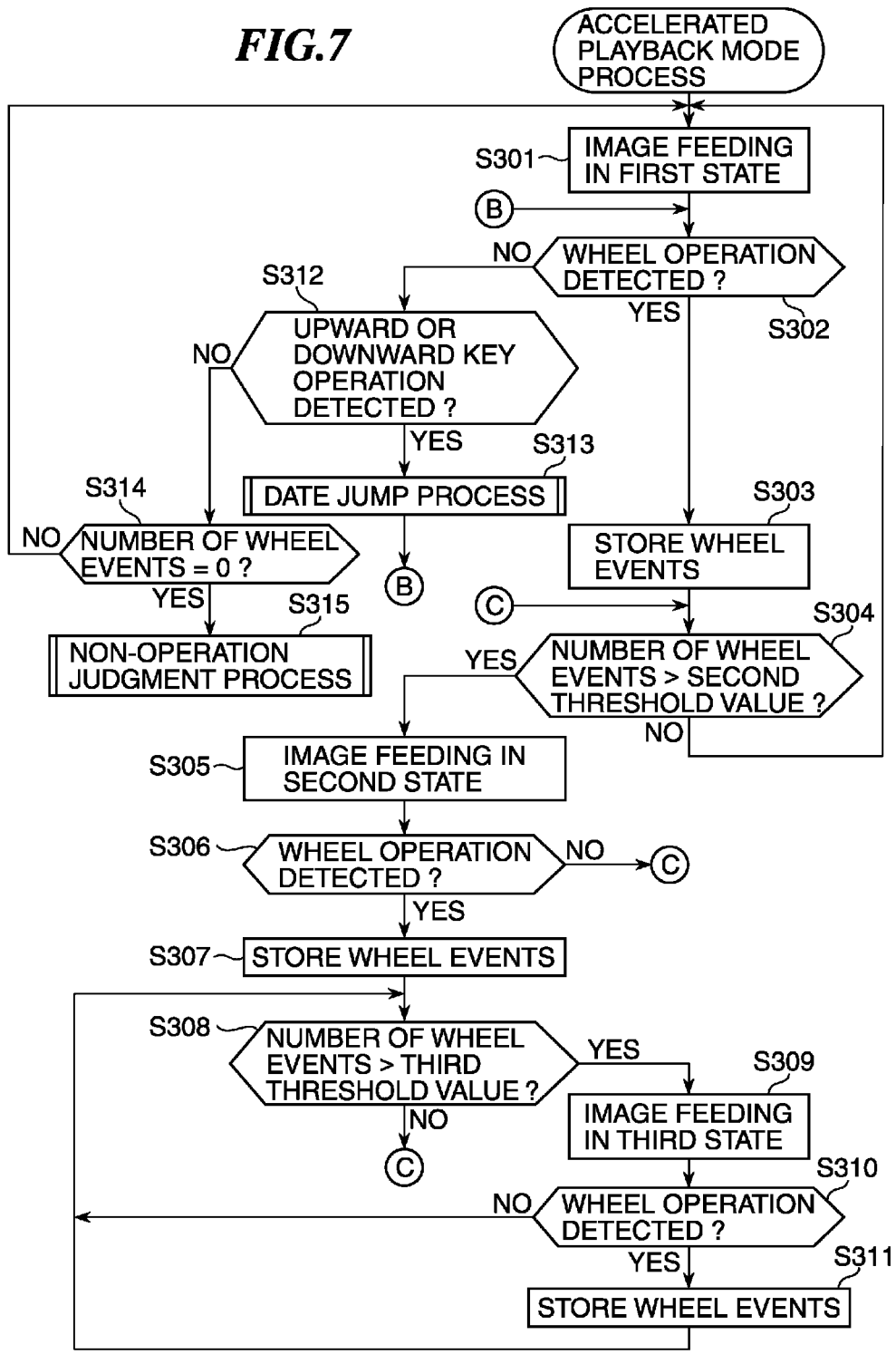
FIG. 7 is a flowchart showing the details of an accelerated playback mode process performed in step S209 in FIG. 4.

FIG. 7 shows in flowchart the details of the accelerated playback mode process performed in step S209 in FIG. 4.

The accelerated playback mode process is realized by the system controller 50 by developing a program stored in the nonvolatile memory 56 and executing the program. As shown in FIG. 7, the controller 50 first performs image feeding in a first state (first display mode) of accelerated playback mode (step S301).

At that time, it is determined based on information on the direction of rotation of wheel events stored in the memory 30 whether image on the screen of the image display unit 28 should be switched to a subsequent image or returned to a preceding image. The image is switched to the subsequent image, if the direction of rotation of the stored wheel events is rightward, and on the other hand, the image is returned to the preceding image, if the direction thereof is leftward.

Figure 8A:
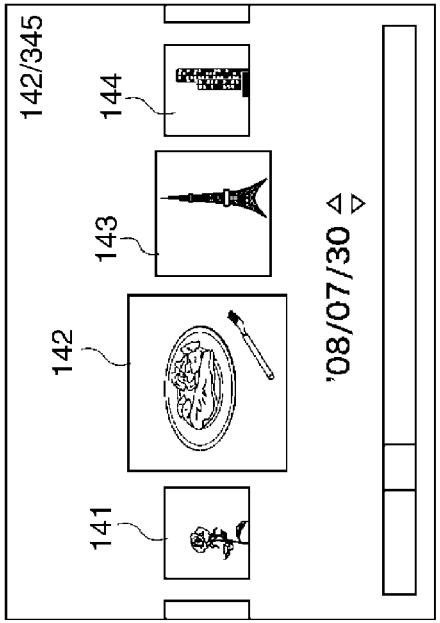
FIGS. 8A to 8D are views showing an example of image feeding performed in a first state of accelerated playback mode.

FIGS. 8A to 8D shows an example of image feeding in the first state of the accelerated playback mode. In the accelerated playback mode, a plurality of images (e.g., images 141, 142, 143, . . . ) are simultaneously displayed in a line from left to right on the image display unit 28 in a state that an image (e.g., image 142) currently selected from among images by the user is centered (FIG. 8A). The currently selected image 142 is displayed in a larger size than the other images, making it easy for the user to visually identify the selected image.

On an upper right side of the screen of the display unit 28, there is an indication that shows the number of images currently recorded in the recording medium (or the number of images to be played back) and the position of the currently selected image in the currently recorded images. In this example, it is indicated that 345 images are recorded in, e.g., the recording medium 200 and one-hundred forty-second image (i.e., image 142) among the 345 images is currently displayed. Below the currently selected image 142, there is displayed the picked up date of the image 142 (in this example, 2008/7/30) (date of date and time information for the image).

Up and down arrow icons are displayed on the right side of the picked up date. These arrow icons indicate that a date jump to change the date can be made by depressing the upward or downward key (upward button 307 or downward button 308) in a state that the arrow icons are displayed. For example, by depressing the downward button 307, the currently selected image 142 can be switched to an image having the earliest photography date/time among images having photography dates later than 2008/7/30, and the image after change can be displayed. It should be noted that the arrow icons are not displayed, if the date jump cannot be made for the reason, e.g., that images whose photography dates are the same as that of the currently selected image are only stored in the recording medium 200. The details of the date jump process will be described later with reference to FIG. 12.

At a lower end of the screen of the display unit 28, there is displayed a bar that indicates the position of the currently selected image in all the images recorded in the recording medium 200 (or in the all the images to be currently played back). With the bar display, the user is able to intuitively grasp how much images are present ahead and behind the currently displayed image 142, and able to grasp, during the image feeding, an image feeding speed relative to all the images recorded in the recording medium 200 (or a time period which will be needed to complete the image feeding, at the current image feeding speed, for all the images recorded in the recording medium 200).

Figure 8B:
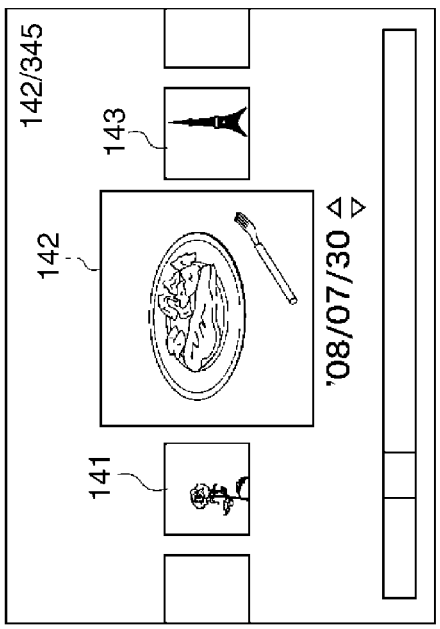
Figure 8C:
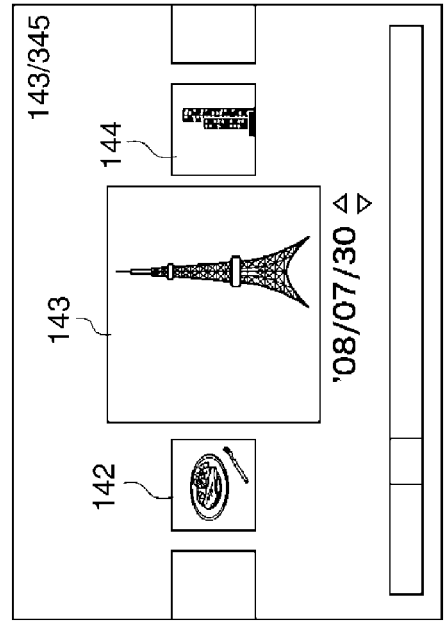
Figure 8D:
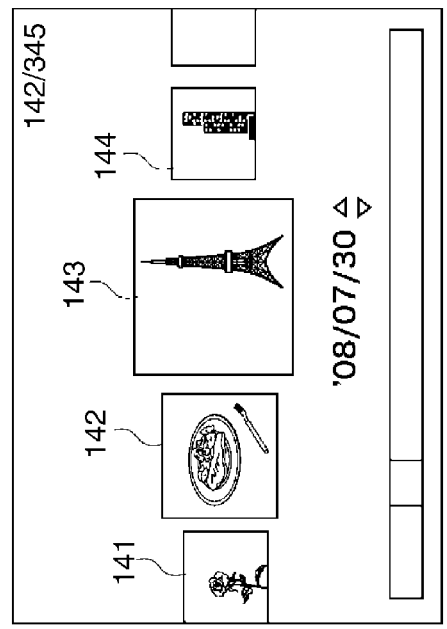

With the image feeding in the first state of accelerated playback mode, the image 142 (FIG. 8A) selected before execution of the image feeding and displayed at the center of the screen of the display unit 28 is moved leftward, while being gradually reduced in size (FIGS. 8B and 8C). On the other hand, the image 143 displayed on the right side of the screen is moved to the center of the screen, while being gradually enlarged in size (FIGS. 8B and 8C). As a result, the image 142 is replaced by the image 143 (FIG. 8D), i.e., the currently selected image is switched to the image 143, whereby the image feeding for one image is completed.

In the accelerated playback mode, the above-described display is given on the display unit 28, whereby animation with a smaller movement of image display position than in the image feeding in the single playback mode is provided. As a result, it is possible to achieve a faster image feeding with the same effect. Since a large number of images can simultaneously be displayed on the screen of the display unit 28, the user is able to make quick image feed without being confused, while identifying what images are present ahead and behind the center image.

When one image shift is made by the image feeding in step S301, one wheel event is consumed. Next, the system controller 50 determines whether a wheel operation is performed by the user (step S302). If it is determined that a wheel operation is made, the flow proceeds to step S303 described later. On the other hand, when determining that no wheel operation is made, the controller 50 determines whether the upward or downward key (upward button 307 or downward button 308) is operated by the user (step S312).

When determining that the upward or downward key is operated, the controller 50 carries out a date jump process (step S313), the details of which will be described later with reference to FIG. 12. After completion of the date jump process, the flow returns to step S302. When determining in step S312 that the upward or downward key is not operated, the system controller 50 determines whether the number of wheel events stored in the memory 30 is zero (step S314).

When determining that the number of wheel events is zero, the system controller 50 carries out a non-operation judgment process (step S315). In this process, a time period for which the user does not perform any operation is measured by a timer, and based on a result of measurement, whether the accelerated playback mode should be terminated is determined. The details of the non-operation judgment process will be described later with reference to FIG. 11. If it is determined that the number of wheel events is not equal to zero, the flow returns to step S301.

Accordingly, even in a case that the user stops performing a wheel operation, if one or more wheel events remain in the memory 30 in the first state of accelerated playback mode, the processing in steps S301, S302, S312, and S314 is repeated, thereby providing an effect to make image feeding appear to continue by inertia on the screen of the image display unit 28.

When determining that a wheel operation is made (YES to step S302), the system controller 50 determines whether the direction of rotation of the wheel operation (operation on the rotary encoder 309) is rightward or leftward (clockwise or anticlockwise). When determining a rightward rotation, the controller 50 stores into the memory 30 one or more rightward rotation wheel events, as wheel events according to an amount of operation. The controller 50 stores one or more leftward rotation wheel events when determining a leftward rotation (step S303).

Next, the system controller 50 determines whether the number of wheel events stored in the memory 30 exceeds a predetermined second threshold value, which is, e.g., about 10 (step S304). If it is determined that the number of wheel events does not exceed the second threshold value, the flow returns to step S301. When determining that the number of wheel events exceeds the second threshold value, the controller 50 shifts the accelerated playback mode from the first state to a second state (second display mode), and carries out the image feeding in the second state of accelerated playback mode (step S305).

For the image feeding, it is determined based on information on the direction of rotation of wheel events stored in the memory 30 whether the image should be switched to a subsequent image or returned to a preceding image on the screen of the image display unit 28. The system controller 50 switches the image to an immediately subsequent image, if the direction of rotation of wheel events is rightward, and returns the image to an immediately preceding image, if the direction of rotation is leftward.

FIGS. 9A to 9D show an example of image feeding on the display unit 28 in the second state of accelerated playback mode. In the second state, thumbnail images 181 to 187 or 182 to 188, which are smaller in size but larger in the number of images than in the first state, are simultaneously displayed in a line from left to right on the display unit 28. Animation effect at image feeding in the second state has the same function as that in the first state, but images are displayed in a smaller size than in the first state. Thus, a movement of image display position due to animation effect becomes small at image feeding for one image.

Since the size of images displayed on the display unit 28 is made small, the load for image display processing is reduced. In addition, photography date/time is not displayed, date jump is prohibited, and a process for reading out photography date/time is omitted. As a result, image feeding can be made at higher speed in the second state than in the first state. In other respects, the image feeding in the second state is the same as in the first state.

When image feeding is made by one image in step S305, a corresponding one of wheel events recorded in the memory 30 is consumed. Next, the system controller 50 determines whether a wheel operation is performed by the user (step S306). If it is determined that no wheel operation is made, the flow returns to step S304. As a result, even after the user stops performing a wheel operation, image feeding is made in the second state in step S305 until the number of events stored in the memory 30 becomes equal to or less than the second threshold value, thereby providing an effect to make image feeding appear to continue by inertia.

Since wheel events stored in the memory 30 are consumed by the image feeding performed in the second state after the wheel operation is stopped, it is sooner or later determined in step S304 that the number of wheel events becomes equal to or less than the second threshold value. In that case, the flow proceeds to step S301, whereby the accelerated playback mode is shifted from the second state to the first state, and image feeding for the remaining number of wheel events is made in the first state. In this manner, the accelerated playback mode is returned to the first state as before the execution of the wheel operation when the number of wheel events recorded in the memory 30, i.e., the number of images to be fed, decreases during the image feeding is performed after completion of the wheel operation according to the recorded wheel events. Thus, a smooth operation feeling is realized. In addition, images become large in size when the first state is returned before completion of image feeding, and therefore, better visibility is ensured. As a result, the user is able to appropriately determine whether the image feeding should be permitted to be completed or should further be continued, while viewing images whose size is enlarged when image feeding is in progress.

When determining in step S306 that a wheel operation is made, the system controller 50 stores into the memory 30 wheel events according to the direction of the wheel operation (step S307). Next, the controller 50 determines whether the number of wheel events stored in the memory 30 exceeds a predetermined third threshold value, which is, e.g., about 20 (step S308).

If it is determined that the number of wheel events does not exceed the third threshold value, the flow returns to step S304. Insofar as the number of wheel events exceeds the second threshold value, the system controller 50 continues the image feeding in the second state. When determining that the number of wheel events exceeds the third threshold value, the system controller 50 shifts the accelerated playback mode from the second state to a third state, and carries out the image feeding in the third state of accelerated playback mode (step S309).

For the image feeding, it is determined whether the image on the screen of the image display unit 28 should be switched to a subsequent image or returned to a preceding image based on information on the direction of rotation of wheel events stored in the memory 30. The system controller 50 causes a shift to an immediately subsequent image, if the direction of rotation of wheel events is rightward, and causes a shift to an immediately preceding image, if the direction thereof is leftward.

Figure 10B:
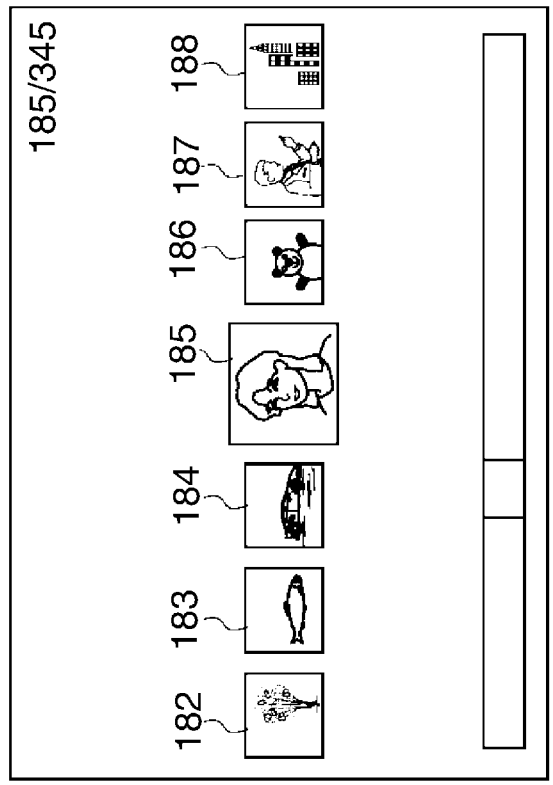
FIGS. 10A and 10B are views showing an example of image feeding in a third state of accelerated playback mode.
Figure 10A:
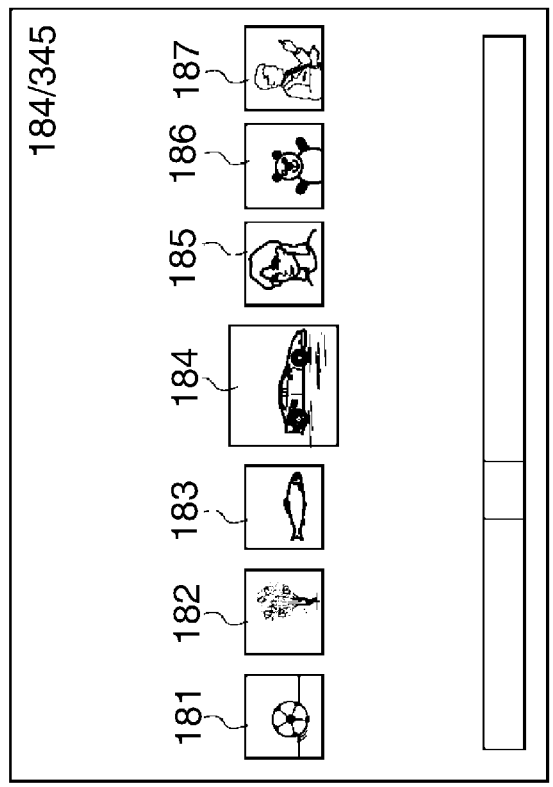

FIGS. 10A and 10B show an example of image feeding on the image display unit 28 in the third state of accelerated playback mode. In the third state, a plurality of images 181 to 187 or 182 to 188 whose number and size are the same as those in the second state are simultaneously displayed in a line from left to right on the image display unit 28. In the third state, a process to provide animation effect is not performed, whereby the image feeding can be made at higher speed.

When an image shift (to a subsequent or preceding image) is made by one image in step S309 in the third state of accelerated playback mode, a corresponding one of wheel events recorded in the memory 30 is consumed. Next, the system controller 50 determines whether a wheel operation is performed by the user (step S310). When determining that a wheel operation is made, the controller 50 stores wheel events into the memory 30 (step S311).

In step S311, to prevent the number of wheel events consumed by the image feeding from being largely lagged behind the increase in number of wheel events, an upper limit is set for the number of wheel events that can be stored in the memory 30 and wheel events beyond the upper limit number are discarded. After wheel events are stored into the memory 30 in step S311, the flow returns to step S308. If it is determined in step S310 that no wheel operation is performed, the flow returns to step S308.

As previously described, image feeding in the first, second, or third state in steps S301, S305, or S309 is made to sometimes provide an effect to make image feeding appear to continue by inertia after the user stops performing a wheel operation. However, if too many images are fed on the image display unit 28 after stoppage of wheel operation, the number of fed images becomes excessive to an extent not intended by the user, which can result in unsatisfactory user-friendliness.

To obviate this, it is possible to determine in steps S301, S305, and S309 what number of images has been fed on the image display unit 28 from when the last wheel event was stored into the memory 30 and to stop image feeding when the number of fed images exceeds a predetermined upper limit number of images, while only permitting wheel events to be consumed. By doing this, it is possible to provide the upper limit for the number of images which can be fed after the user stops performing a wheel operation and to prevent an excessive number of images not intended by the user from being fed.

(Non-Operation Judgment Process)

Figure 11:
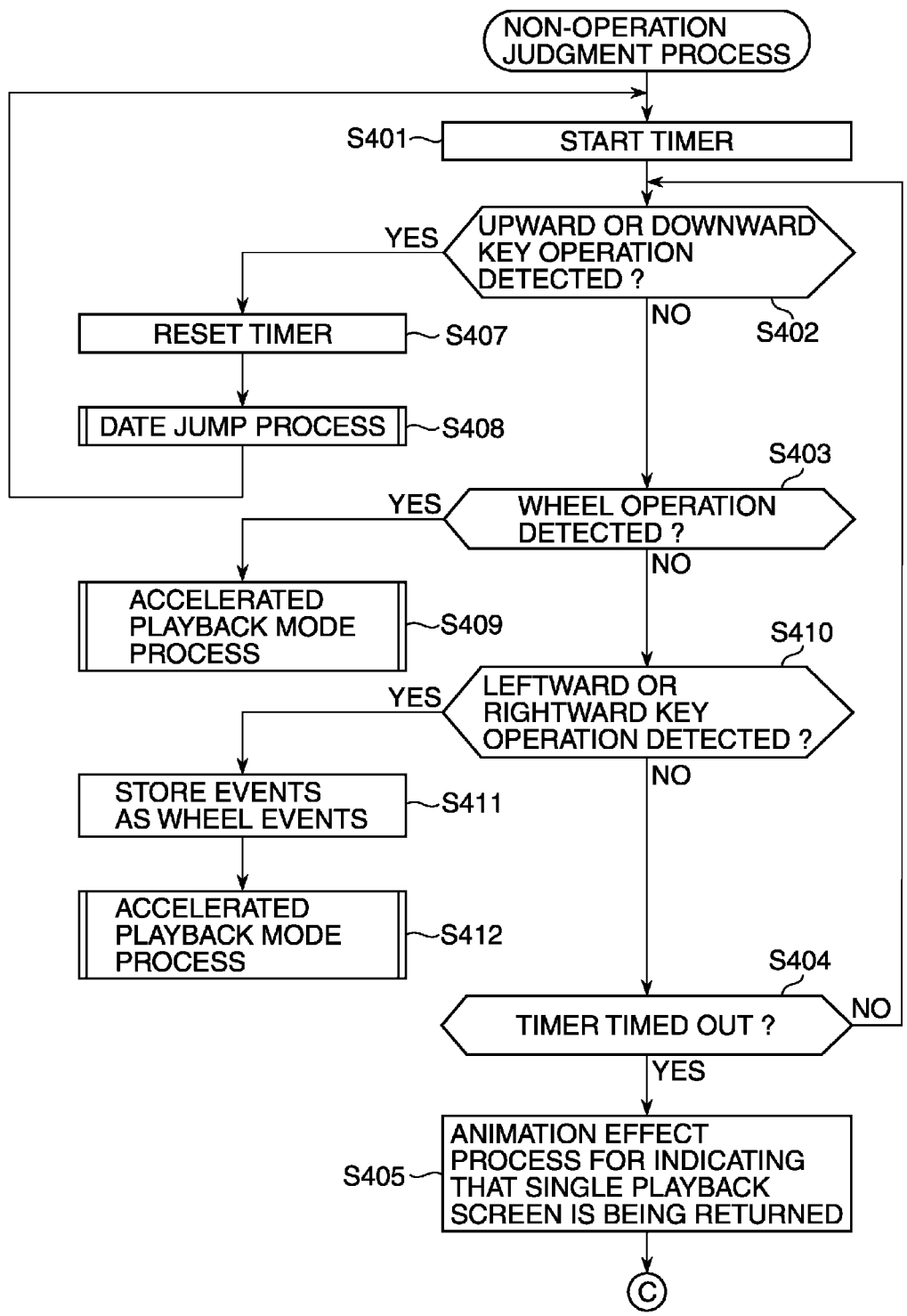
FIG. 11 is a flowchart showing the details of a non-operation judgment process in FIG. 7.

FIG. 11 shows in flowchart the details of the non-operation judgment process performed in step S315 in FIG. 7.

The non-operation judgment process is realized by the system controller 50 by developing on the memory 52 a program stored in the nonvolatile memory 56 and executing the program. In FIG. 11, the controller 50 starts a measurement timer for measuring a non-operation time period in which an operation system (operating unit 70 and switches) is not operated by the user (step S401), and determines whether the upward or downward key (upward button 307 or downward button 308) is operated by the user (step S402).

When determining that neither the upward key nor the downward key is operated, the system controller 50 determines whether a wheel operation is made (step S403). When determining that a wheel operation is made, the system controller 50 carries out the accelerated playback mode process shown in FIG. 7 (step S409). When determining that no wheel operation is performed, the controller 50 determines whether either the leftward key or the rightward key (leftward button 305 or rightward button 306) is operated (step S410).

When determining that neither the leftward key nor the rightward key is operated, the controller 50 determines whether the measurement timer started in step S401 is timed out (whether a predetermined time period has elapsed) (step S404).

If it is determined that the measurement timer is not timed out, the flow returns to step S402. When determining that the timer is timed out, the system controller 50 performs an animation effect process for indicating that the display screen of the image display unit 28 is being returned to a single playback screen (step S405). After completion of the animation effect process, the flow returns to step S202 in FIG. 4.

In the animation effect process in step S405, an image currently selected by the user (which is displayed in a large size on the screen center) is gradually enlarged in size in the first state of accelerated playback mode. As a result, a full-screen display (in which a display image is made consistent in height or width with the screen) is provided on the image display unit 28.

When determining that the upward or downward key is operated (YES to step S402), the system controller 50 resets the measurement timer started in step S401 (step S407), and performs a date jump process (step S408), the details of which will be described later with reference to FIG. 12. After completion of the date jump process, the flow returns to step S401.

When determining that the leftward or rightward key is operated (YES to step S410), the system controller 50 resets the measurement timer started in step S401 and stores wheel events into the memory 30, while handling the number of operations on the leftward or rightward key as an amount of operation on the wheel. Specifically, if the operation on the rightward button 306 is made, a rightward rotation wheel event is stored. If the operation on the leftward button 305 is made, a leftward rotation wheel event is stored. Next, the controller 50 performs the accelerated playback process shown in FIG. 7 (step S412).

As a result, even by button operations, image feeding can be made in the first state of accelerated playback mode process. As compared to a wheel operation, button operations do not enable the user to input a number of events at a time, but permits the user to input events one by one with reliability. This makes it easy to reliably search for a desired image even during the accelerated playback mode process.

As described above, a single playback mode is automatically returned under the control of the system controller 50, if no operation is made for a while after transition to the accelerated playback mode process is made according to a user's wheel operation performed at a speed equal to or higher than a predetermined speed. Specifically, when a quick image feeding operation is performed by the user, transition to the accelerated playback mode process is automatically made, so that a plurality of images are simultaneously displayed on the image display unit 28, which makes it easy for the user to find a desired image even during quick image feeding.

If the user's image feeding operation is made slow, a display state of the image display unit 28 is made more easily visible by switching the third state of accelerated playback mode to the second state and to the first state, thereby enabling the user to reliably select a desired image. After completion of the user's image feeding operation (selection of image), the single playback mode for full-screen display is automatically established under the control of the system controller 50. Therefore, when completing the selection of image, the user is able to confirm the desired image on the large full-screen display of the image display unit 28.

(Date Jump Process)

FIG. 12 shows in flowchart the details of the date jump process performed in step S313 in FIG. 7 and in step S408 in FIG. 11.

The date jump process is realized by the system controller 50 by developing onto the memory 52 a program stored in the nonvolatile memory 56 and executing the program. As shown in FIG. 12, the system controller 50 determines whether the number of photographed images recorded in the recording medium 200 is greater than one (step S501). If it is determined that the number of photographed images is equal to or less than one, the date jump process is completed. When determining that the number of photographed images is greater than one, the controller 50 determines whether the user operates the upward key to give an instruction to turn back the date (step S502).

If it is determined that the upward key (upward button 307) is not depressed, this indicates that the downward key (downward button 308) is operated to give an instruction to advance the date. In that case, from among images having file numbers next to (subsequent to) the file number of the currently selected image, the controller 50 searches for images that have dates different from the date of the currently selected image, and selects a headmost image (an image with which attribute information is associated) from among the found images. Then, the controller 50 renews the display on the image display unit 28 such that the selected image is displayed at the center of the screen, immediately preceding and immediately subsequent images having file numbers immediately preceding and immediately subsequent to the file number of the selected image are displayed on both sides of the selected image, the next preceding and next subsequent images are displayed adjacent to the immediately preceding and immediately subsequent images, respectively, and so on (step S503). A date jump is performed in this manner, whereupon the date jump process is completed.

When determining that the upward key is depressed, the system controller 50 searches for images having the same date as that of the currently selected image from among images each having a file number smaller than that of the currently selected image, and selects a headmost image (image with which attribute information is associated) from among the found images. If there is no image ahead of the currently selected image and having the same date as that of the currently selected image, this indicates that the currently selected image is the first image among images having the same date as that of the currently selected image. In that case, from among images each having a file number smaller than that of the currently selected image, the controller 50 searches for images each having a different date from the currently selected image, and selects the headmost image from among the found images. Then, the controller 50 renews the display on the image display unit 28 such that the selected image is displayed at the center of the screen, immediately preceding and immediately subsequent images having file numbers immediately preceding and immediately subsequent to the file number of the selected image are displayed on both sides of the selected image, the next preceding and next subsequent images are displayed adjacent to the immediately preceding and immediately subsequent images, respectively, and so on. A date jump (step S504) is performed in this manner, whereupon the date jump process is completed.

Since the date jump process can be made when the accelerated playback mode process is in progress, image selection can be made further quickly.

It should be noted that in this embodiment, it is assumed that the date handled in the date jump process is a photographed date determined based on photographed date/time information contained in, e.g., Exif (Exchange Image File Format) information of image. Alternatively, the date can of course be set based on file creation date/time or file update date/time.

In this embodiment, a jump performed in units of date is described as an example of jump, but this is not limitative. For example, a jump can be performed in units of year, month, or hour.

In this embodiment, a wheel operation can be replaced by an operation of the leftward or rightward key (rightward button 306 or leftward button 305). Specifically, instead of operating the rotary operation member, the leftward button 306 or the rightward button 305 can be long pressed. In that case, a user's operation on the rotary operation member is replaced by an operation of continuously pressing either the leftward button 306 or the rightward button 305 for more than a given time period. In addition, by continuously pressing the either button for more than a predetermined time period, an accelerated rotation operation can be realized such that a transition is made from the first state of accelerated playback mode process to the second state and to the third state. In that case, the degree of acceleration can be increased upon each elapse of a prescribed time period. Instead of long press, the either button can be repetitively operated, and a speed of repetitive button operations determined based on a measured number of times of button depression per predetermined time period can be handled as alternative to a speed of rotation operation. In other words, a transition to the accelerated playback mode can be made on condition that the rightward button 306 or leftward button 305 is depressed more than a predetermined number of times within a predetermined time period, whereby the accelerated playback mode and the single playback mode can properly be used according to the speed of operation of the operation member.

In this embodiment, the accelerated playback mode function can be enabled or disabled on the menu screen or on other setting screen. When, e.g., the accelerated playback mode function is disabled, a transition to the accelerated playback mode is not performed according to a wheel operation, but image feeding is performed on a single image display with animation effect, as described in step S212 in FIG. 4. The image feeding on the single image display is performed plural number of times in sequence, while a wheel operation is being continued. At that time, an image feeding interval (speed) may be constant or may be varied according to a wheel operation speed such that the image feeding interval is made shorter with a faster wheel rotation.

In addition to normal image feeding, fast image feeding with an image feeding interval shorter than that in the normal image feeding can be set in advance, and a shift can be made from the normal image feeding to the fast image feeding when the number of wheel events recorded in the memory 30 becomes equal to or larger than a given number. Alternatively, a shift from normal image feeding to fast image feeding can be made on condition that a wheel operation is performed at a given speed or higher speed for more than a given time period.

To notify the user that the accelerated playback mode function is disabled, it is possible to perform image feeding without animation effect as described in step S212 in FIG. 4 or to perform image feeding with different animation effect.

As described in detail above, with this embodiment, multi-image feeding is made on the image display unit 28 for quick search for a desired image according to a wheel operation, and a single image feeding is made for accurate image search according to an operation of the leftward or rightward key. In the multi-image feeding, a plurality of thumbnail images are displayed in small size. On the other hand, in the single image feeding, a single image is displayed on the entire screen.

As a result, it is possible to perform image feeding on the image display unit 28 according to a user's operation (operation on the leftward or rightward key, wheel operation, and wheel operation speed), whereby reliable and quick search can be achieved to find a desired image. The visibility of display on the image display unit 28 can also be improved by changing the way of image display (display in single playback mode or in the first, second, or third state of accelerated playback mode) on the image display unit 28 according to a user's operation.

(Other Embodiments)

In the above-described embodiment, the rotary encoder is taken as an example of the rotary operation member, which is used to give an instruction to make image feeding on the image display unit, but this is not limitative. Specifically, any operation member (e.g., linear encoder, touch sensor, touch panel, track ball, etc.) can be used as long as it enables to confirm a user's rotating operation thereon. The leftward and rightward buttons are taken as an example of operation members used to give an instruction to make image feeding, but this is not limitative. Any operation member (e.g., a switch) can be used as long as it enables a user's operation thereon.

In a case, for example, that a touch sensor is used as a rotary operation member, a pressure-sensitive touch sensor can be disposed in annular (or circular) arrangement so as to constitute a pseudo rotary operation member. With the pressure-sensitive touch sensor, the resultant operation member per se is not rotatable, but capable of detecting that a user touches the annular (or circular) operation member. Thus, an operation equivalent to rotating the rotary encoder can be made by the user by lightly tracing the operation member by hand.

FIG. 13 shows in schematic view the internal construction of a pressure-sensitive touch sensor adapted to be mounted on an image pickup apparatus according to another embodiment of this invention.

As shown in FIG. 13, the pressure-sensitive touch sensor 700 is comprised of an operation member 701 and a variable resistor 702. The operation member 701 is formed into, e.g., an annular shape (or circular shape), and the variable resistor 702 which is band-shaped is disposed inside the operation member 701 circumferentially thereof and coaxially therewith. A voltage from a power unit is applied to the variable resistor 702. It should be noted that the image pickup apparatus mounted with the pressure-sensitive touch sensor 700 is basically the same in construction as the embodiment shown in FIG. 1, and an illustration and a description thereof are omitted.

When the user touches an outer periphery of the operation member 701 to make image feeding on the screen of the image display unit of the image pickup apparatus, the resistance of the variable resistor 702 disposed inside the operation member 701 varies according to the position touched by the user. The touch sensor 700 has an A/D converter that analog-to-digital converts the resistance of the variable resistor 702. The system controller 50 reads a value of output of the A/D converter of the sensor 700 at intervals of an extremely short time period (in the order of msec).

The system controller 50 compares a currently read value with a previously read value. If there is more than a certain difference between these values, the controller 50 determines that an operation is performed by the user, calculates an amount of operation on the operation member 701, and controls image feeding on the image display unit 28 as described in the above-described embodiment. Although not limitative, the certain difference can be set to a value representing a change in resistance of the variable resistor 702 that corresponds to, e.g., one-eighth of the circumferential length of the operation member 701. In that case, if there is more than the certain difference between the value currently read from the sensor 700 and the previously read value, the controller 50 determines that the user operates the operation member 701, and calculates an amount of operation on the operation member 701 based on a change in the output of the sensor 700.

Also in this embodiment, time intervals at which the output value of the sensor 700 is read are extremely short and can be negligible. Therefore, it can be regarded for the user that the amount of operation on the sensor 700 is detected at the same time as the user operates the pressure-sensitive touch sensor 700.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-033904, filed Feb. 17, 2009, which is hereby incorporated by reference herein in its entirety.

What is claimed is:

1. A display control apparatus having first and second display modes, comprising:
an operation unit configured to receive a user operation that instructs image feeding in a state where a plurality of images are displayed on a display unit at the same time; and
a control unit configured to control the image feeding, wherein in a case where image feeding is performed in a second display mode, the control unit controls the image feeding so as (i) to continue to be performed in the second display mode after completion of the user operation, and (ii) subsequently to be performed in a first display mode, with the second display mode switched to the first display mode, and
wherein the images displayed in the second display mode are larger in number and smaller in size than the images displayed in the first display mode.

2. The display control apparatus according to claim 1, wherein the control unit controls the image feeding to be performed after the completion of the user operation and controls the display mode to be switched from the second display mode to the first display mode when a number of remaining images to be subjected to the image feeding becomes equal to or less than a predetermined number.

3. The display control apparatus according to claim 1, wherein the control unit controls, while the operation unit is receiving the user operation, the image feeding so as to be performed in at least one display mode, in accordance with a manner of the user operation for the operation unit, among a plurality of display modes including the first display mode and the second display mode.

4. The display control apparatus according to claim 1, further including
a storage control unit configured to control a storage unit to store a user operation amount of the user operation to which the operation unit is subjected,
wherein a number of images to be subjected to the image feeding by the control unit after completion of the user operation is determined based on the user operation amount stored in the storage unit.

5. The display control apparatus according to claim 3, wherein the plurality of display modes further includes a third display mode in which the display unit displays a single image, and wherein the control unit controls the image feeding so as to be performed in the third display mode in a case where a user operation amount of the user operation to which the operation unit is subjected is less than a predetermined value.

6. The display control apparatus according to claim 5, further comprising:
a non-operation determination unit configured to determine, in the first display mode, whether or not a predetermined operation including the image feeding operation on the operation unit is performed for a predetermined time period; and
a mode switching unit configured to switch the display mode to the third display mode when the non-operation determination unit determines that the predetermined operation is not performed for the predetermined time period.

7. The display control apparatus according to claim 3, further comprising a button operation determination unit configured to determine whether or not a button operation member, which is an operation member other than the operation unit, is depressed,
wherein the control unit controls, in a case where the button operation determination unit determines that the button operation member is depressed in the first display mode, the image feeding so as to be performed for a number of images corresponding to a number of times by which the button operation member is depressed in the first display mode.

8. The display control apparatus according to claim 7, wherein when the image feeding is performed in a third display mode due to the user operation on the operation unit, the image feeding is performed with an animation effect of indicating an image feeding direction of the display unit, whereas when the image feeding is performed in the third display mode due to the operation of the button operation member, the image feeding is performed without the animation effect.

9. The display control apparatus according to claim 3, further comprising an image switching unit configured to switch, in the first display mode, a currently selected image among a plurality of images displayed in the first display mode to an image associated with particular attribute information, according to an operation of another operation unit different from the operation unit.

10. The display control apparatus according to claim 9, wherein the particular attribute information is date and time information as to the earliest time of a date in the date and time information for the image which has been displayed in the first display mode before switching of the image switching unit.

11. The display control apparatus according to claim 9, wherein the particular attribute information is date and time information as to the earliest time of a next date next to a date in the date and time information for the image which has been displayed in the first display mode before switching of the image switching unit.

12. The display control apparatus according to claim 1, wherein the operation unit is any one of a rotary encoder, a linear encoder, a touch sensor, a touch panel, and a track ball.

13. The display control apparatus according to claim 1, wherein the control unit controls, in the first display mode and the second display mode, the image feeding so as to be performed with an animation effect of indicating an image feeding direction of the display unit.

14. An image pickup apparatus comprising the display control apparatus according to claim 1.

15. A display control method using first and second display modes, comprising:
an operation step of receiving a user operation that instructs image feeding in a state where a plurality of images are displayed on a display unit at the same time; and
a control step of controlling the image feeding,
wherein in a case where image feeding is performed in a second display mode, the control step controls the image feeding so as (i) to continue to be performed in the second display mode after completion of the user operation, and (ii) subsequently to be performed in a first display mode, with the second display mode switched to the first display mode, and
wherein the images displayed in the second display mode are larger in number and smaller in size than the images displayed in the first display mode.

16. A non-transitory computer-readable storage medium storing a program for causing a computer to execute a display control method using first and second display modes,
the display control method comprising:
an operation step of receiving a user operation that instructs image feeding in a state where a plurality of images are displayed on a display unit at the same time; and
a control step of controlling the image feeding,
wherein in a case where image feeding is performed in a second display mode, the control step controls the image feeding so as (i) to continue to be performed in the second display mode after completion of the user operation, and (ii) subsequently to be performed in a first display mode, with the second display mode switched to the first display mode, and
wherein the images displayed in the second display mode are larger in number and smaller in size than the images displayed in the first display mode.

17. A display control apparatus having first and second display modes, comprising:
an operation unit configured to receive a user operation that instructs image feeding in a state where a plurality of images are displayed on a display unit at the same time; and
a control unit configured to control the image feeding,
wherein in a case where (1) a user completes a user operation, (2) the completed user operation is received by the operation unit, and (3) image feeding corresponding to the completed user operation is not completed, the control unit controls the image feeding so as (i) to be performed in a second display mode, and (ii) subsequently to be performed in a first display mode, with the second display mode switched to the first display mode, and
wherein the images displayed in the second display mode are larger in number and smaller in size than the images displayed in the first display mode.

18. A display control method using first and second display modes, comprising:
an operation step of receiving a user operation that instructs image feeding in a state where a plurality of images are displayed on a display unit at the same time; and
a control step of controlling the image feeding,
wherein in a case where (1) a user completes a user operation, (2) the completed user operation is received at the operation step, and (3) image feeding corresponding to the completed user operation is not completed, the control step controls the image feeding so as (i) to be performed in a second display mode, and (ii) subsequently to be performed in a first display mode, with the second display mode switched to the first display mode, and wherein the images displayed in the second display mode are larger in number and smaller in size than the images displayed in the first display mode.

19. A non-transitory computer-readable storage medium storing a program for causing a computer to execute a display control method using first and second display modes, the display control method comprising:

an operation step of receiving a user operation that instructs image feeding in a state where a plurality of images are displayed on a display unit at the same time; and a control step of controlling the image feeding, wherein in a case where (1) a user completes a user operation, (2) the completed user operation is received at the operation step, and (3) image feeding corresponding to the completed user operation is not completed, the control step controls the image feeding so as (i) to be performed in a second display mode, and (ii) subsequently to be performed in a first display mode, with the second display mode switched to the first display mode, and wherein the images displayed in the second display mode are larger in number and smaller in size than the images displayed in the first display mode.

* * * * *